United States Patent Office 3,330,687
Patented July 11, 1967

3,330,687
METHOD OF IMPARTING COFFEE STAIN RESISTANCE TO AMINOPLAST RESIN-CONTAINING ARTICLES AND THE ARTICLES PREPARED THEREBY
Aleksandra Chrobok Nawakowski, Glenbrook, Conn., assignor to Formica Corporation, Cincinnati, Ohio, a corporation of Delaware
No Drawing. Filed Jan. 16, 1964, Ser. No. 338,017
16 Claims. (Cl. 117—63)

This invention relates to novel methods of imparting resistance to staining, and particularly to staining caused by coffee and tea, to heat- and pressure-consolidated articles manufactured from the thermosetting aminoplast resins, such as melamine-formaldehyde resins. This invention further relates to stain-resistant, heat- and pressure-consolidated, thermoset aminoplast resin-containing articles, such as molded or laminated melamine-formaldehyde articles, prepared according to our novel methods, as well as to the stain-retarding compositions used to impart stain-resistance to said articles.

The many excellent properties possessed by thermosetting aminoplast resins, and in particular by aminotriazine-aldehyde resins such as melamine-formaldehyde resins, have led to their widespread use in the molding and laminating fields. More particularly, these thermosetting or heat-hardenable resins possess, in the cured or thermoset state, superior break-resistance, resistance to water and other solvents, to softening or other internal heat-failures, to cracking when exposed to electrical stress, and to surface failures such as loss of gloss, discoloration or crazing due to heat and light, all of which features render them especially suitable for the preparation of heat- and pressure-consolidated molded and laminated articles.

However, laminated table, counter and bar tops, molded cups, saucers, plates, and the like prepared from conventional thermosetting aminoplast resins such as melamine-formaldehyde resins do possess one deficiency which detracts from their overall excellence, in that they are susceptible to various kinds of stains. Coffee and tea are among the worst offenders in this respect, but other substances, and especially acidic substances, for example, the juices of various fruits and vegetables, such as raspberry, grape, and beet juices, to mention just a few, soft drinks (e.g., cola drinks), cocoa, and the like, also leave stains which detract from the appearance, although not the durability, of such articles, and which are difficult to remove even if attended to a short time after contact.

This propensity of conventionally prepared heat- and pressure-consolidated aminoplast resins articles for staining has limited, in many cases, the extent to which such articles have found acceptance in many important areas of everyday use. For example many people, and especially restaurateurs and other large-volume users of dinnerware, have been reluctant to replace chinaware with high-quality tableware made from thermosetting melamine-formaldehyde resinous compositions despite the latter's many obviously superior properties.

I have now discovered that market resistance to staining, particularly to staining caused by acidic substances such as coffee and tea, can be imparted to heat- and pressure-consolidated articles manufactured from thermosetting aminoplast resins such as melamine-formaldehyde resins by a procedure which in essence involves:

(1) Coating the surfaces to be protected in said articles, i.e., all or part of the total surface area, with a stain-retarding composition comprising a solution having a pH of from about 2 to 4 of a resinous material selected from the group consisting of homopolymers of a monomer (A) of the formula

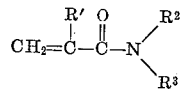

where R' is selected from the group consisting of hydrogen, methyl, and ethyl groups and $R^2$ and $R^3$ are selected from the group consisting of hydrogen and lower alkyl groups, and copolymers of at least 10 weight percent of said monomer (A) with (B) ethylenically unsaturated monomers copolymerizable therewith.

(2) Heat-treating the thus-coated article to convert the resinous coating on the surface of the article to a tack-free film, and (3) Washing the heat-treated article with a solvent for said resinous coating to remove the non-adhering portion of said film.

It is therefore an object of my invention to provide novel heat- and pressure-consolidated articles manufactured from thermosetting aminoplast resins, and particularly from melamine-formaldehyde resins, which are resistant to staining by common foods and beverages.

It is also an object of our invention to provide novel methods of imparting stain-resistance to heat- and pressure-consolidated articles manufactured from thermosetting aminoplast resins and particularly from melamine-formaldehyde resins.

A further object of my invention is to provide stain-retarding compositions of matter useful in imparting stain-resistance to heat- and pressure-consolidated articles manufactured from thermosetting aminoplast resins and particularly from melamine-formaldehyde resins.

These and other objects of my invention will be apparent to those skilled in the art, especially upon consideration of the ensuing discussion and examples.

The homopolymers which can be used in preparing the stain-retarding compositions employed in the practice of this invention include the polymers of the compounds encompassed by the structural formula set forth above. Among these compounds are acrylamide, methacrylamide, ethacrylamide and the corresponding N-alkyl and N,N-dialkyl derivatives, e.g., N-methylacrylamide, N-ethylacrylamide, N-propylacrylamide, N-isopropylacrylamide, N-n-butylacrylamide, N-tert-butylacrylamide, N,N-dimethylacrylamide, N,N-diethylacrylamide, N,N-di-n-butylacrylamide, N,N-ditert-butylacrylamide, and the like. Molecular weights of the polymers of the foregoing monomers may range from about 100,000 to 1,500,000 or higher (weight average molecular weight as determined by the light scattering method [see Flory, Principles of Polymer Chemistry, Cornell University Press, 1953, pages 266–316]). The preferred range is 500,000 to 1,000,000. These homopolymers of controlled molecular weight can be obtained by known methods such as polymerization in an aqueous medium containing approximately 5% to 40% by volume of a water-miscible alcohol in the presence of a catalyst such as hydrogen peroxide and potassium persulfate. One such procedure is that of U.S. Patent No. 2,486,191.

When available the methylol derivatives of polyacrylamide, e.g., methylol polyacrylamide, may also be employed. These derivatives may be prepared by reacting an aqueous solution of polyacrylamide with formaldehyde in the presence of basic catalysts, preferably in the pH range of from about 8 to 10. These and other details of preparation are known in the art.

Copolymers of the above monomers with ethylenically unsaturated monomers copolymerizable therewith are equally effective in the practice of this invention provided that said copolymers contain at least about 10 weight percent, preferably greater than 30 weight percent, of the acrylamide-type compounds encompassed by the formula set forth above. The term "copolymer" is here intended to include materials prepared from two different monomers, whether both are monomers of the acrylamide type or one is an acrylamide-type monomer while the other is another ethylenically unsaturated type to be described, and materials prepared from mixtures of acrylamide-type monomers and one or more of the ethylenically unsaturated compounds to be described. Said compounds which are copolymerizable with the acrylamide-type monomers may be simple olefins, e.g., ethylene, propylene, isobutylene, and the like; styrene, side-chain- or ring-substituted styrenes, e.g., α-methylstyrene, o-, m-, and p-methylstyrene, and the like; vinyl ether and vinyl esters, e.g., vinyl acetate; N-vinyl pyrrolidone; acrylic and methacrylic acid and the alkyl esters thereof, e.g., ethyl acrylate, methyl methacrylate; acrylonitrile, vinyl chloride, vinyl ketones, vinyl pyridines; copolymerizable acid salts, e.g., sodium vinyl sulfonate, and the like. The preparation of these copolymers is known in the art and therefore need not be described. Thus the methods described in U.S. Patents 2,593,399 and 2,620,330 are applicable to the preparation of copolymers of styrene and acrylamide. Literature describing the preparation of the foregoing polymers and copolymers is referenced in "New Product Bulletin," Collective Volume III, pages 1 to 44, published by the American Cyanamid Company, 1954, and is herein incorporated by reference. Molecular weights of the copolymers may be of the same wide range as for the homopolymers. But here also, the higher molecular weights, e.g., above about 500,000, are preferred.

For convenience and safety in handling and use in the method of this invention, the preferred homopolymers and copolymers are those which are water-soluble. However, when suitable precautions are taken, other solvents for the particular polymer may be employed, e.g., an inert organic solvent, preferably a water-miscible polar solvent having a boiling point at atmospheric pressure above about 50° C., such as methanol, ethanol, n-propanol, isopropanol, and the like; acetone, acetonyl acetone, tetrahydrofuran, dioxane, formamide, dimethylformamide, diethylformamide, acetonitrile, propionitrile, ethyl sulfoxide, dimethyl sulfoxide, ethylene glycol monomethyl ether, diethylene glycol monoethyl ether acetate, diethylene glycol diethyl ether, and the like, as well as mixtures thereof. Mixtures of water and a water-miscible inert organic solvent may also be employed when the polymer or copolymer is soluble in said system to the desired extent.

Whether water, an inert organic solvent or a mixture thereof is present, the relative amounts of solvent and polymer or copolymer used can be varied over a wide range, depending first of all on the method employed in applying the composition to the surface of the heat- and pressure-consolidated aminoplast resin article being treated. For instance, if the composition is to be applied using a doctor knife or similar spreading means, relatively viscous solutions will be prepared. In such a case, relatively smaller amounts of solvent are needed. If, on the other hand, the composition is to be applied by spraying, by brush or roller coating, or by dipping the article therein, larger amounts of solvent will be employed. The concentration of the polymer or copolymer in the treating solution will also depend on the article being treated. For instance, where vertical surfaces, e.g., the sides of a cup, are being treated, relatively high viscosities are desirable, whereas for other applications where the treating solution would be less likely to run or sag, lower viscosities can be tolerated. Finally, in the case of organic solutions, the viscosity will depend on the particular solvent chosen, inasmuch as various solvents will give solutions having different viscosities, even where the concentration of the polymer or copolymer resin in such solutions remains the same. For most applications, relatively dilute coating compositions, for example, those having a resin solids content ranging from about 1% to about 30% by weight, preferably 10% to 20%, based on the total weight of the solution, are preferred.

Acidic conditions are required in the practice of the method of this invention. Generally, a pH of from about 2 to 4 must be maintained. A lower pH will cause erosion of the aminoplast surface during the heat-treating step and a higher pH will be ineffective to aid the curing of the coating composition on the surface of the aminoplast article. When the resinous coating composition is inherently acidic, for example, when a copolymer of acrylamide and an acidic monomer such as sodium vinyl sulfonate is employed, no additional acidic material need be used. However, when the coating resin lacks sufficient acidity or is neutral or alkaline, conventional acid catalysts may be added. Any organic or inorganic acid or acid-yielding material can be used. Examples of such materials are acetic acid, maleic acid, benzoic acid, lactic acid, propionic acid, boric acid, oxalic acid, hydrochloric acid, sulfuric acid, phosphoric acid, sulphamic acid, butane sulfonic acid, paratoluene-sulfonic acid, any of the acid-yielding esters of the foregoing, zinc chloride, aluminum chloride, ferric chloride, stannic chloride, and the like. From about 0.001% to 5.0%, preferably 0.1% to 1.0%, based on the resin solids in the coating composition, of the acid may be employed. When the acid is a strong acid, lesser amounts may be used. Conversely, greater concentrations may be used when the acid is weak.

The thickness of the coating of the stain-retarding composition applied to the surface of the heat- and pressure-consolidated aminoplast resin article is not critical, so long as any part of the surface which is to be rendered stain retardant is covered with the composition and close contact is established between the coating composition and aminoplast surface.

Following the application of the composition to the article, the coated article can, if desired, be allowed to air dry at room temperature for several hours before being heat-treated. However, the wet, coated article will usually be heat-treated or baked immediately after being coated, using any temperature high enough to drive off the solvent and ultimately render the resinous coating substantially tack-free without affecting the aminoplast resin article itself. Preferably, temperatures ranging from about 120° C. to about 170° C. will be employed and, under these conditions, the heat-treatment will usually take from about 20 minutes to about one hour, the shorter times corresponding to the higher temperatures, and vice versa.

While I do not wish to be bound by any view offered to explain the operation of my invention, three theories have been advanced to explain the stain-resistant action provided by the method of this invention. Thus the beneficial effect may possibly be derived from chemical reaction, during the heat-treatment, of the amine groups contained in the acrylamide-type treating resin with certain reactive sites, e.g., methylol or methoxymethyl groups, on the surface of the heat- and pressure-consolidated aminoplast article being treated, thereby inactivating said sites or groups to attack by stain-producing agents. A second theory is that the resin applied as a coating to the surface of the aminoplast article acts as a barrier to staining agents, preventing said agents from reaching and attacking the aminoplast surface. A third view is that the applied resin encourages a more advanced cure of the surface of the aminoplast resin, thereby reducing the possible tendency to uneven expansion and contraction to which aminoplast articles would be subject in use. This uneven expansion and contraction is thought to cause crevices or other faults which open the lesser cured subsurfaces to attack by staining compounds.

As a result of the heat-treatment, the acrylamide-type polymer is generally converted to a hard, brittle, solid coating, and it is probable that the resin undergoes a certain amount of cross-linking. Nevertheless, the non-adhering portion of the coating, i.e., that portion which perhaps has not reacted with reactive sites on the surface of the aminoplast resin article, is easily removed by washing. Water or any solvent for the particular coating applied can be used. The temperature of the wash solution is not critical. Thus, wash solution at room temperature or even as high as the boiling point of the solvent are effective. In some cases the non-adhering portion may be manually removed, e.g., by peeling, and very little washing will be required.

Thermosetting aminoplast resins of the type employed in the manufacture of the heat- and pressure-consolidated articles treated in accordance with the practice of the present invention are synthetic resins prepared by the condensation reaction of an amino (including imino) or amido (including imido) compound with an aldehyde. Resinous condensates of this type, as well as methods for their preparation, have been shown innumerable times in the prior art, and adequate disclosures of them may be found in, for example, U.S. Patent Nos. 2,197,357; 2,310,004 and 2,328,592 to Widmer et al. and 2,260,239 to Talbot. The present invention is concerned particularly with the treatment of molded and laminated articles prepared from aminoplast resins of the type wherein one or more aminotriazines containing at least two amidogen groups, each having at least one aldehyde-reactable hydrogen atom attached to the amidogen nitrogen atom, e.g., melamine, have been reacted with an aldehyde, such as formaldehyde, to yield a potentially thermoset resinous condensate, i.e., one which has been carried to an intermediate stage of condensation whereby it remains as a resinous material soluble or readily dispersible in aqueous systems while also remaining capable of being converted, under suitable conditions of heat and pressure, to a substantially insoluble and infusible form.

Melamine is the preferred aminotriazine reactant for preparing the heat-curable or potentially heat-curable partially polymerized aminotriazine-aldehyde resinous reaction products which are treated according to the practice of the present invention, but other aminotriazines, e.g., mono-, di- and tri-substituted melamines, such as the mono-, di- and trimethylmelamines, and the like, or guanamines, such as formoguanamine, acetoguanamine, benzoguanamine, and the like, may be utilized as reactants with any suitable aldehyde in preparing the aminotriazine-aldehyde resinous reaction product. Similarly, formaldehyde, preferably in aqueous solution, is the preferred aldehyde reactant, but other aldehydes, e.g., acetaldehyde, propionaldehyde, butyraldehyde, benzaldehyde, and the like, or compounds engendering aldehydes, e.g., paraformaldehyde, hexamethylenetetramine, and the like, may also be employed. The properties desired in the finishd product and economic considerations are among the elements which will determine the choice of the particular aminotriazine and aldehyde employed.

The mol ratio of aldehyde to aminotriazine in such resinous reaction products is not critical, and may be within the order of from about 1.5:1 to about 4:1, respectively, depending on the nature of the starting materials and the characteristics desired in the final product, but it is preferred that the mol ratio be within the order of from about 2:1 to about 3:1, respectively. Similarly, the reaction conditions conventionally employed in preparing these resinous reaction products can be varied to a considerable extent, e.g., the aldehyde and aminotriazine may be heat-reacted at temperatures ranging from about 40° C. to reflux temperature, i.e., about 100° C., for periods of time ranging from about 30 to 120 minutes, at a pH ranging from about 6.5 to 10, either by themselves or in an aqueous medium.

Other amido or imido compounds besides the aminotriazines may also be employed in preparing the thermosetting aminoplast resins used in the heat- and pressure-consolidated articles treated in accordance with the present invention. Among them there are included urea and those of its derivatives having at least one aldehyde-reactable hydrogen atom which have been commonly used in the preparation of aminoplast resinous compositions, such as for example the alkylureas, e.g., mono- and dimethylurea, haloureas, and the like.

The various processes for the preparation of heat- and pressure-consolidated molded and laminated articles from aminoplast resinous compositions are so well known in the art that no further mention need be made of them here, except to say that the aminoplast resinous compositions may be used with any conventional material, e.g., α-cellulose paper, cellulosic fabrics, silk glass cloth, rayon, nylon, or other synthetic fabrics, and the like, in the preparation of laminates and also that aminoplast resinous compositions may have incorporated therewith for molding purposes conventional fillers, such as α-cellulose, regenerated cellulose, or other cellulosic fibers, glass or other synthetic fibers, asbestos, mica, sand, ground cork, and the like, mold lubricants, such as zinc stearate, glyceryl monostearate, and the like, and curing catalysts, such as phthalic anhydride, p-toluenesulfonic acid, benzenesulfonic acid, and the like.

In order that those skilled in the art may more fully understand the inventive concept presented herein, the following examples are set forth. These examples are given solely by way of illustration and should not be considered as expressing limitations unless so set forth in the appended claims. All parts and percentages are by weight, unless otherwise stated.

EXAMPLE I

A 15% aqueous solution of polyacrylamide (of a weight average molecular weight of about 750,000, said polymer having been prepared by a known method, e.g., that of U.S. Patent No. 2,486,191), to which was added 1.0% paratoluenesulphonic acid (based on the resin solids) to reduce the pH to 2.8, was applied by brushing on a clean white coffee cup, molded from a commercially-available α-cellulose-filled melamine-formaldehyde resin molding composition (formaldehyde:melamine mol ratio of 2:1, respectively), to give a continuous coating over the entire surface of the cup. Next, the wet, coated cup was baked in a forced circulation hot air oven at 150° C. for 30 minutes. Finally the heat-treated cup, after cooling to room temperature, was washed off under cold running water in order to remove the non-adhering portion of the resin coating. The cup was left seemingly unchanged as compared to its untreated state.

In order to demonstrate the coffee stain-resistance of the treated cup, the following accelerated coffee-staining test was carried out. A strong brew of black coffee was prepared by dissolving 32 grams of a commercially available instant coffee in one liter of boiling water. The resulting coffee solution was then cooled to 80° C., and the treated cup, together with an identically molded but untreated white control cup, was immersed therein for 100 hours. At the end of the immersion period, both cups were removed from the coffee solution, washed with soap and water, and dried. The treated cup showed no staining, whereas the untreated cup had become heavily stained and dark brown in color.

EXAMPLES II–V

The procedure employed in Example I was repeated with other acrylamide-type coating compositions with the results indicated in Table I. In each case the resulting treated cups were far superior in resistance to coffee staining as compared to an untreated cup inasmuch as the treated cups withstood staining for periods of time ranging from 24 to 100 hours when subjected to the accelerated coffee-staining test described in Example I, whereas untreated cups became heavily stained after only 14 hours immersion in the coffee solution.

TABLE I

| Example | Coating Composition [1] | Stain Resistance [2] |
|---|---|---|
| II | 10% poly-N-isopropylacrylamide, aqueous solution; 1% p-TSA,[3] based on resin solids. | 40 |
| III | 10% poly-N-tert-butylacrylamide in methanol; 1% p-TSA,[3] based on resin solids. | 24 |
| IV | 10% copolymer of acrylamide and sodium vinyl sulfonate (1:1 mol ratio), aqueous solution (contains 1.8% free acid, pH=2.7). | 100 |
| V | 10% copolymer of acrylamide and styrene (1:1 mol ratio) in methanol; 1% p-TSA, based on resin solids. | 40 |

[1] In each example the non-adhering portion of the coating composition was removed after the heat treatment by washing the cups with the solvent used to prepare the coating composition solutions.
[2] Hours to first appearance of stain after immersion in 3.2% aqueous coffee solution at 80° C.
[3] Paratoluenesulfonic acid.

It will be obvious to those skilled in the art that other changes and variations can be made in carrying out the present invention without departing from the spirit and scope thereof as defined in the appended claims.

I claim:
1. A method of imparting stain resistance to a heat- and pressure-consolidated aminoplast resin-containing article which comprises:
   (1) coating said article with a composition comprising a solution having a pH of from about 2 to 4 of a resinous material selected from the group consisting of homopolymers of a monomer (A) of the formula

$$CH_2=C-C-N\begin{array}{c}R^2\\R^3\end{array}$$
$$\phantom{CH_2=}\begin{array}{cc}R^1 & O\end{array}$$

where $R^1$ is selected from the group consisting of hydrogen, methyl, and ethyl groups and $R^2$ and $R^3$ are selected from the group consisting of hydrogen and lower alkyl groups, and copolymers of at least 10 weight percent of said monomer (A) with (B) a different ethylenically unsaturated monomer copolymerizable therewith,
   (2) heat-treating the resulting coated article to convert said resinous material to a tack-free film, and
   (3) washing said heat-treated coated article with a solvent for said resinous material to remove the nonadhering portion of said film.

2. The method of claim 1 wherein said aminoplast resin is a melamine-formaldehyde resin.

3. The method of claim 1 wherein said aminoplast resin is a urea-formaldehyde resin.

4. A method of imparting stain resistance to a heat- and pressure-consolidated aminoplast resin-containing article which comprises:
   (1) coating said article with a composition comprising a solution having a pH of from about 2 to 4 of polyacrylamide,
   (2) heat-treating the resulting coated article to convert said polyacrylamide coating to a tack-free film, and
   (3) washing said heat-treated coated article with a solvent for said polyacrylamide to remove the non-adhering portion of said film.

5. A method of imparting stain resistance to a heat- and pressure-consolidated aminoplast resin-containing article which comprises:
   (1) coating said article with a composition comprising a solution having a pH of from about 2 to 4 of poly-N-isopropylacrylamide,
   (2) heat-treating the resulting coated article to convert said poly-N-isopropylacrylamide coating to a tack-free film, and
   (3) washing said heat-treated coated article with a solvent for said poly-N-isopropylacrylamide to remove the non-adhering portion of said film.

6. A method of imparting stain resistance to a heat- and pressure-consolidated aminoplast resin-containing article which comprises:
   (1) coating said article with a composition comprising a solution having a pH of from about 2 to 4 of poly-N-tert-butylacrylamide,
   (2) heat-treating the resulting coated article to convert said poly-N-tert-butylacrylamide coating to a tack-free film, and
   (3) washing said heat-treated coated article with a solvent for said poly-N-tert-butylacrylamide to remove the non-adhering portion of said film.

7. A method of imparting stain resistance to a heat- and pressure-consolidated aminoplast resin-containing article which comprises:
   (1) coating said article with a composition comprising a solution having a pH of from about 2 to 4 of a copolymer of (A) at least 10 weight percent acrylamide with (B) sodium vinylsulfonate,
   (2) heat-treating the resulting coated article to convert said copolymer coating to a tack-free film, and
   (3) washing said heat-treated coated article with a solvent for said copolymer to remove the non-adhering portion of said film.

8. A method of imparting stain resistance to a heat- and pressure-consolidated aminoplast resin-containing article which comprises:
   (1) coating said article with a composition comprising a solution having a pH of from about 2 to 4 of a copolymer of (A) at least 10 weight percent of acrylamide with (B) styrene,
   (2) heat-treating the resulting coated article to convert said copolymer coating to a tack-free film, and
   (3) washing said heat-treated coated article with a solvent for said copolymer to remove the non-adhering portion of said film.

9. A stain-resistant heat- and pressure-consolidated aminoplast resin containing article coated with a hard, tack-free resinous material selected from the group consisting of homopolymers of a monomer (A) of the formula:

$$CH_2=C-C-N\begin{array}{c}R^2\\R^3\end{array}$$
$$\phantom{CH_2=}\begin{array}{cc}R^1 & O\end{array}$$

where $R^1$ is selected from the group consisting of hydrogen, methyl, and ethyl groups and $R^2$ and $R^3$ are selected from the group consisting of hydrogen and lower alkyl groups, and copolymers of at least 10 weight percent of said monomer (A) with (B) a different ethylenically unsaturated monomer copolymerizable therewith.

10. A stain-resistant heat- and pressure-consolidated aminoplast resin-containing article coated with a hard, tack-free film of polyacrylamide.

11. A stain-resistant heat- and pressure-consolidated aminoplast resin-containing article coated with a hard, tack-free film of poly-N-isopropylacrylamide.

12. A stain-resistant heat- and pressure-consolidated aminoplast resin-containing article coated with a hard, tack-free film of poly-N-tert-butylacrylamide.

13. A stain-resistant heat- and pressure-consolidated aminoplast resin-containing article coated with a hard, tack-free film of a copolymer of (A) at least 10 weight percent acrylamide with (B) sodium vinylsulfonate.

14. A stain-resistant heat- and pressure-consolidated aminoplast resin-containing article coated with a hard, tack-free film of a copolymer of (A) at least 10 weight percent acrylamide with (B) styrene.

15. A stain-resistant heat- and pressure-consolidated melamine-formaldehyde resin-containing article coated with a hard, tack-free resinous material selected from the group consisting of homopolymers of a monomer (A) of the formula:

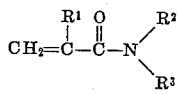

where $R^1$ is selected from the group consisting of hydrogen, methyl, and ethyl groups and $R^2$ and $R^3$ are selected from the group consisting of hydrogen and lower alkyl groups, and copolymers of at least 10 weight percent of said monomer (A) with (B) a different ethylenically unsaturated monomer copolymerizable therewith.

16. A stain-resistant heat- and pressure-consolidated urea-formaldehyde resin-containing article coated with a hard, tack-free resinous material selected from the group consisting of homopolymers of a monomer (A) of the formula:

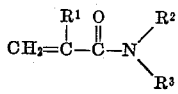

where $R^1$ is selected from the group consisting of hydrogen, methyl, and ethyl groups and $R^2$ and $R^3$ are selected from the group consisting of hydrogen and lower alkyl groups, and copolymers of at least 10 weight percent of said monomer (A) with (B) a different ethylenically unsaturated monomer copolymerizable therewith.

References Cited

UNITED STATES PATENTS

| | | | |
|---|---|---|---|
| 2,748,029 | 5/1956 | Spear et al. | 117—161 |
| 2,945,775 | 7/1960 | Lehman et al. | 117—161 |
| 3,026,293 | 3/1962 | Caldwell et al. | 117—161 |
| 3,111,420 | 11/1963 | Boenig et al. | 117—138.8 |
| 3,131,086 | 4/1964 | Nyquist et al. | 117—138.8 |
| 3,211,579 | 10/1965 | Reiter | 117—138.8 |
| 3,215,553 | 11/1965 | Nawakowski et al. | 117—63 |
| 3,228,792 | 1/1966 | Nyquist | 117—138.8 |
| 3,255,139 | 6/1966 | Dinges et al. | 117—161 |

WILLIAM D. MARTIN, *Primary Examiner.*

M. LUSIGNAN, *Assistant Examiner.*